US012714104B2

(12) United States Patent
Namba et al.

(10) Patent No.: US 12,714,104 B2
(45) Date of Patent: Aug. 25, 2026

(54) COMPOSITION FOR CONTROLLING FLYING PEST INSECTS

(71) Applicant: Kao Corporation, Tokyo (JP)

(72) Inventors: Aya Namba, Tokyo (JP); Toshiaki Iida, Tokyo (JP); Ryota Koizumi, Tokyo (JP)

(73) Assignee: Kao Corporation, Tokyo (JP)

( * ) Notice: Subject to any disclaimer, the term of this patent is extended or adjusted under 35 U.S.C. 154(b) by 360 days.

(21) Appl. No.: 18/281,037

(22) PCT Filed: Mar. 8, 2022

(86) PCT No.: PCT/JP2022/009843
§ 371 (c)(1),
(2) Date: Sep. 8, 2023

(87) PCT Pub. No.: WO2022/191156
PCT Pub. Date: Sep. 15, 2022

(65) Prior Publication Data

US 2024/0156088 A1 May 16, 2024

(30) Foreign Application Priority Data

Mar. 11, 2021 (JP) ................................ 2021-039556

(51) Int. Cl.
*A01N 37/02* (2006.01)
*A01N 25/06* (2006.01)
(Continued)

(52) U.S. Cl.
CPC ............ *A01N 37/02* (2013.01); *A01N 25/06* (2013.01); *A01N 25/30* (2013.01); *A01N 37/10* (2013.01); *A01P 7/04* (2021.08)

(58) Field of Classification Search
CPC . A01N 37/02; A01N 25/30; A01P 7/04; A01P 17/00
See application file for complete search history.

(56) References Cited

U.S. PATENT DOCUMENTS

2010/0247684 A1 9/2010 Reid et al.
2023/0292744 A1 9/2023 Saito et al.

FOREIGN PATENT DOCUMENTS

CN 1660872 A 11/2008
CN 102669092 A 9/2012
(Continued)

OTHER PUBLICATIONS

International Search Report for PCT/JP2022/009843; I.A. fd Mar. 8, 2022, mailed May 24, 2022, by the Japan Patent Office, Tokyo, Japan.

(Continued)

*Primary Examiner* — San Ming R Hui
(74) *Attorney, Agent, or Firm* — Oblon, McClelland, Maier & Neustadt, L.L.P.

(57) ABSTRACT

[1] A flying pest exterminating composition which is used by spraying on flying pests, containing: a surfactant (A); at least one compound (B) selected from an organic acid and an organic acid salt; and water, in which the surfactant (A) contains at least one selected from (A1) a salt of a mono- or diester of an aliphatic alcohol having 5 or more and 18 or less carbon atoms and sulfosuccinic acid, and (A2) a mixture of a polyoxyalkylene alkyl ether (a1) and an alkyl glyceryl ether (a2), and [2] a flying pest exterminating spray including a spray container and the flying pest exterminating composition according to [1] filled in the spray container.

18 Claims, 1 Drawing Sheet

(51) Int. Cl.

| | |
|---|---|
| ***A01N 25/30*** | (2006.01) |
| ***A01N 37/10*** | (2006.01) |
| ***A01P 7/04*** | (2006.01) |

(56) References Cited

FOREIGN PATENT DOCUMENTS

| | | | | |
|---|---|---|---|---|
| CN | 105028465 A | | 11/2015 | |
| JP | 2009-161471 A | | 7/2009 | |
| JP | 2011-516484 A | | 5/2011 | |
| JP | 2012-097004 A | | 5/2012 | |
| JP | 2014-43429 A | | 3/2014 | |
| WO | WO 2009/123907 A1 | | 10/2009 | |
| WO | WO-2014189478 A2 | * | 11/2014 | ............... A61K 8/22 |
| WO | WO 2021/054319 A1 | | 3/2021 | |

OTHER PUBLICATIONS

International Preliminary Report on Patentability (IPRP), Chapter I of the Patent Cooperation Treaty, including the Written Opinion, for PCT/JP2022/009843; I.A. fd Mar. 8, 2022 issued Sep. 12, 2023, by the International Bureau of WIPO, Geneva, Switzerland.

* cited by examiner

[Fig. 1]
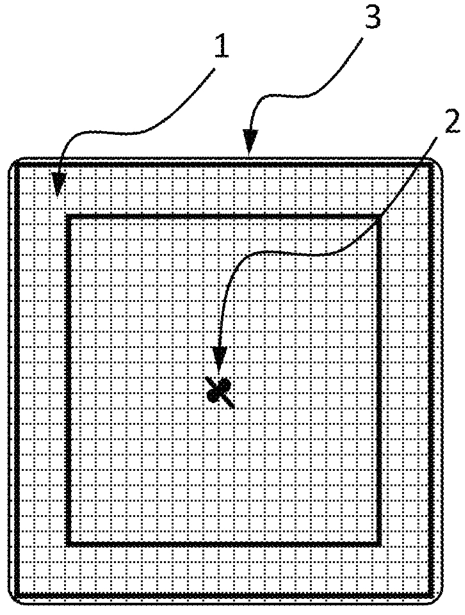
[Fig. 2]
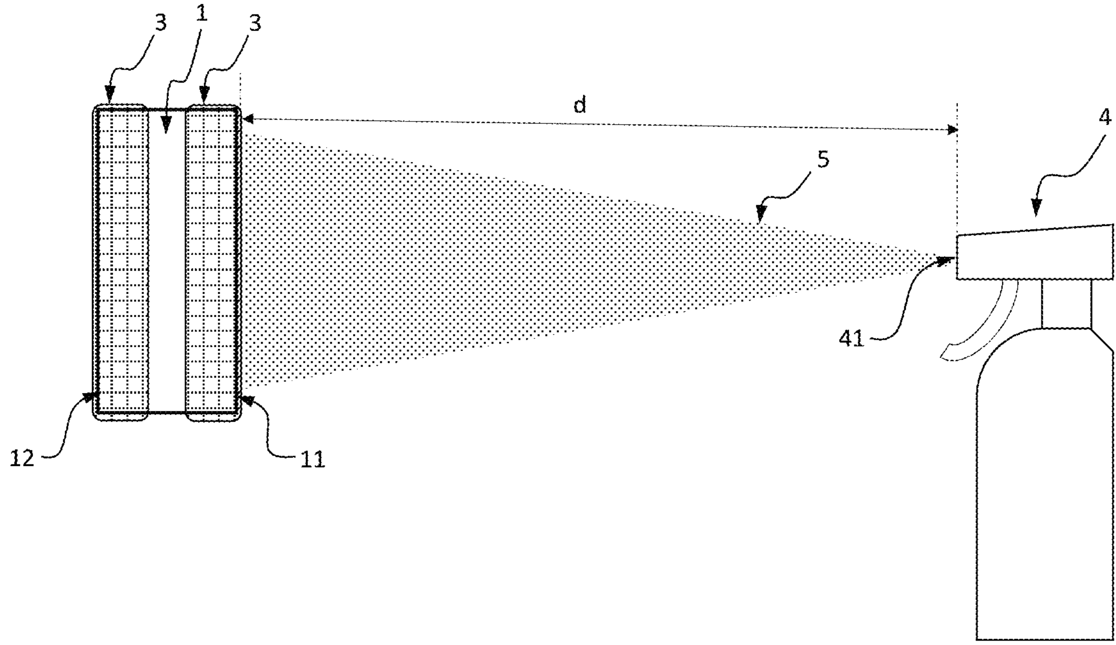

COMPOSITION FOR CONTROLLING FLYING PEST INSECTS

FIELD OF THE INVENTION

The present invention relates to a flying pest exterminating composition and a flying pest exterminating spray.

BACKGROUND OF THE INVENTION

Pests, for example, flying pests, such as mosquitoes and flies, carry pathogens to animals, such as humans, and are factors that cause infectious diseases and dermatitis. In particular, some mosquitoes are hygienically very harmful insects because they carry pathogens, such as dengue fever, Zika fever, yellow fever, encephalitis, and malaria.

Conventionally, in order to protect themselves from such flying pests, a method of spraying an insecticide has been widely used.

However, in insecticidal components contained in insecticides, there is a concern to safety for a human body. In particular, it is desired to apply a highly safe insecticide to young children who always get bitten by mosquitoes.

In addition, conventionally, it has been studied to prevent insect bite and sting mainly outdoors. However, according to recent research, it has become clear that the frequency of mosquito bite even indoors is equal to or higher than that outdoors. Then, a proposal for defending oneself from flying pests even indoors is desired.

With respect to a method for capturing and exterminating flying pests without using an insecticidal component, for example, JP2012-97004A (PTL 1) discloses that a pest exterminator and a pest extermination preparation, each of which is an aqueous liquid containing a (meth)acrylic acid alkyl ester copolymer having film formability and a surfactant, exhibit a pest extermination effect even without containing an insecticidal component.

JP2011-516484A (PTL 2) discloses a pesticide composition which contains a pesticide and an adjuvant and provides a synergistic killing rate.

SUMMARY OF THE INVENTION

The present invention relates to a flying pest exterminating composition which is used by spraying on flying pests, containing: a surfactant (A); at least one compound (B) selected from an organic acid and an organic acid salt; and water, in which the surfactant (A) contains at least one selected from (A1) a salt of a mono- or diester of an aliphatic alcohol having 5 or more and 18 or less carbon atoms and sulfosuccinic acid, and (A2) a mixture of a polyoxyalkylene alkyl ether (a1) and an alkyl glyceryl ether (a2).

DETAILED DESCRIPTION OF THE INVENTION

The pest exterminator of PTL 1 is one which by containing the (meth)acrylic acid alkyl ester copolymer having film formability, lowers flexibility of alae of a flying pest during spraying on the flying pest, loses the flying ability, or forms a film capable of blocking the spiracles or trachea to suffocate the pest, thereby exhibiting an effect for exterminating the pest. However, in view of the fact the pest exterminator of the type of spraying on flying pests is required to be adjusted to a viscosity suitable for spraying, the addition amount of a polymer that is an active ingredient as the pest exterminator is substantially restricted.

PTL 2 describes spraying a composition containing a pesticide and an adjuvant to insects, but a method of spraying a composition containing a pesticide which is an insecticidal component is not a preferable method from the viewpoint of human body safety.

In view of the above, a composition which is highly safe to the human body and the environment and has improved insecticidal properties is required for a pest exterminator of a type to be sprayed on flying pests.

The present invention relates to a flying pest exterminating composition and a flying pest exterminating spray, which are used by spraying on flying pests, have high safety to the human body and the environment, and have improved insecticidal properties.

The present inventors have found that in a flying pest exterminating composition which is used by spraying on flying pests, when sprayed on flying pests, the flying ability of the flying pests can be reduced by incorporating a surfactant (A) containing at least one selected from (A1) a salt of a mono- or diester of an aliphatic alcohol having 5 or more and 18 or less carbon atoms and sulfosuccinic acid and (A2) a mixture of a polyoxyalkylene alkyl ether and an alkyl glyceryl ether into the composition. Further, the present inventors have found that by incorporating at least one compound (B) selected from an organic acid and an organic acid salt into the composition, the insecticidal properties against flying pests can be improved while ensuring safety to the human body and the environment.

In addition, in the present invention, reducing the flying ability of flying pests means that the flying pest becomes unable to fly. In the present invention, killing a flying pest refers to killing the flying pest so that the flying pest becomes completely immobile.

That is, the present invention relates to the following [1] and [2].

[1] A flying pest exterminating composition which is used by spraying on flying pests, containing: a surfactant (A); at least one compound (B) selected from an organic acid and an organic acid salt; and water, in which the surfactant (A) contains at least one selected from (A1) a salt of a mono- or diester of an aliphatic alcohol having 5 or more and 18 or less carbon atoms and sulfosuccinic acid, and (A2) a mixture of a polyoxyalkylene alkyl ether (a1) and an alkyl glyceryl ether (a2).

[2] A flying pest exterminating spray including a spray container and the flying pest exterminating composition according to [1] filled in the spray container.

According to the present invention, it is possible to provide a flying pest exterminating composition and a flying pest exterminating spray, which are used by spraying on flying pests, have high safety to the human body and the environment, and have improved insecticidal properties.

BRIEF DESCRIPTION OF THE DRAWING

FIG. 1 is an explanatory view of a method for evaluating the insecticidal properties against flying pests, and is a schematic plan view of a frame (1) in which mosquitoes are enclosed, which is used for the evaluation.

FIG. 2 is another explanatory view of the method for evaluating the insecticidal properties against flying pests, and is a schematic view of a state in which the flying pest exterminating composition is sprayed into the frame (1) as viewed from the side surface direction of the frame (1).

FLYING PEST EXTERMINATING COMPOSITION

The flying pest exterminating composition of the present invention (hereinafter, also referred to as "the composition of the present invention") contains a surfactant (A) (hereinafter, also referred to as a "component (A)"), at least one compound (B) selected from an organic acid and an organic acid salt (hereinafter, also referred to as a "component (B)"), and water, and the surfactant (A) contains at least one selected from (A1) a salt of a mono- or diester of an aliphatic alcohol having 5 or more and 18 or less carbon atoms and sulfosuccinic acid (hereinafter, also referred to as a "component (A1)"), and (A2) a mixture of a polyoxyalkylene alkyl ether (a1) and an alkyl glyceryl ether (a2) (hereinafter, also referred to as a "component (A2)").

By containing the surfactant (A), the flying pest exterminating composition of the present invention has a function of reducing the flying ability when brought into contact with the alae of flying pests. Further, by containing the organic acid or the organic acid salt (B), the composition has a function of killing flying pests. That is, the composition of the present invention exhibits an effect of exterminating flying pests by suppressing the flying of flying pests, dropping flying pests during flying or landing on a wall or the like onto the ground, and killing flying pests.

In the present invention, the "flying pest" refers to a pest that approaches an animal, such as a human, while flying and suck blood from the skin of the animal, a pest that mediates pathogenic bacteria or the like while flying even without sucking blood, and a pest in which its own flying gives a feeling of displeasure to a human.

Specific examples of the flying pest include mosquitoes, such as *Anopheles sinensis, Culex pipiens pallens, Culex tritaeniorhynchus, Aedes aegypti, Culex pipiens molestus, Aedes albopictus, Aedes togoi, Anopheles gambiae*, and *Anopheles stephensi*; chironomidae, such as *Chironomus yoshimatsui* and *Propsilocerus akamusi*; black flies, such as *Twinnia japonensis, Prosimulium yezoense*, and *Odagmia aokii*; flies, such as *Musca domestica, Muscina stabulans, Fannia canicularis*, Calliphoridae, Sarcophagidae, *Delia platura, Delia antiqua*, fruit flies, fruit vinegar flies, moth flies, tsetse flies, and *Stomoxys calcitrans*; horseflies, such as *Tabanus stygius, Tabanus trigonus, Chrysops suavis*, and *Haematopota pluvialis*; biting midges, such as *Leptoconops nipponensis, Culicoides sumatrae*, and *Culicoides arakawae*; and bees, such as *Vespa simillima xanthoptera, Polistes jokahamae*, and honeybees.

The flying pest exterminating composition of the present invention exhibits an excellent extermination effect particularly against mosquitoes among them.

The reason why the effects of the present invention can be obtained is presumed as follows.

First of all, the bodies of flying pests are hydrophobic, so they don't get wet by water by nature. However, the composition of the present invention contains the components (A1) and/or (A2) which have low surface tension and fast adsorption to a solid-liquid interface and thus are easily wet and spread on the surface of the pests. Therefore, it is considered to be excellent in the action of wetting the body of the flying pest and suppressing the flying ability. The composition of the present invention further contains a compound (B) having an insecticidal function. It is considered that since the compound (B) can be efficiently penetrated by wetting the body of a flying pest by the action of the components (A1) and/or (A2), the insecticidal properties against flying pests can be improved.

That is, the present invention is to kill and exterminate flying pests by spraying a flying pest exterminating composition containing the components (A1) and/or (A2) and the compound (B) to the flying pests while effectively wetting the body of flying pests and depriving the flying pests of their abilities to fly.

Further, all of the components (A1) and (A2) and the compound (B) contained in the composition of the present invention are excellent in safety to the human body and the environment.

As described above, the flying pest exterminating composition of the present invention uses the components (A1) and/or (A2), which are excellent in safety to the human body and the environment and are capable of effectively wetting the body of flying pests, and the compound (B), which is capable of effectively killing flying pests, as active ingredients for exterminating flying pests, and it is possible to obtain a flying pest exterminating composition having a high exterminating effect without containing conventional insecticidal components having concerns about safety to the human body and the environment, so that safety to the human body and the environment is high.

The flying pest exterminating composition of the present invention may be applied to not only pests during flying but also, for example, flying pests landing on the wall or the ground.

The details of the flying pest exterminating composition of the present invention are hereunder described.

<Component (A): Surfactant>

The composition of the present invention contains, as the component (A), at least one selected from (A1) a salt of a mono- or diester of an aliphatic alcohol having 5 or more and 18 or less carbon atoms and sulfosuccinic acid and (A2) a mixture of a polyoxyalkylene alkyl ether (a1) and an alkyl glyceryl ether (a2).

By containing at least one component selected from the components (A1) and (A2), the composition of the present invention has an excellent action of being easily wetted and spread on the surface of a pest, and the effect of reducing the flying ability and the effect of allowing the component (B) to penetrate into flying pests are enhanced.

(Component (A1))

Component (A1) is a salt of a monoester and/or diester of an aliphatic alcohol having 5 or more and 18 or less carbon atoms and sulfosuccinic acid, and preferably a salt of a diester.

The number of carbon atoms of the aliphatic alcohol constituting the component (A1) is 5 or more, preferably 6 or more, and more preferably 7 or more, and 18 or less, preferably 14 or less, and more preferably 10 or less.

The salt in the component (A1) is preferably an alkali metal salt, more preferably at least one selected from a sodium salt and a potassium salt, and still more preferably a sodium salt.

(Component (A2))

Component (A2) includes a polyoxyalkylene alkyl ether (a1) and an alkyl glyceryl ether (a2).

The polyoxyalkylene alkyl ether (a1) is preferably a compound represented by the following general formula (1).

$$R^1—O—(Y)_m—H \quad (1)$$

In the formula (1), $R^1$ represents an alkyl group; Y represents an oxyethylene unit and/or an oxypropylene unit; and m represents an average addition molar number of Y.

In the general formula (1), the number of carbon atoms of the alkyl group constituting $R^1$ is preferably 8 or more and 22 or less, more preferably 8 or more and 18 or less, and still more preferably 8 or more and 14 or less from the viewpoint that the action of wetting the alae of flying pests is excellent and the viewpoint that the straightness of the sprayed droplets of the composition is enhanced to efficiently exterminate the flying pests. Although the alkyl group may be any of a linear alkyl group and a branched alkyl group, it is preferably a linear alkyl group from the viewpoint that the surface tension is lowered, and the action of wetting the alae of flying pests is excellent.

Y represents an oxyethylene unit and/or an oxypropylene unit, and Y is preferably an oxyethylene unit. m represents an average addition molar number of Y, and m is preferably 4 or more, and more preferably 6 or more from the viewpoint of enhancing the straightness of the sprayed droplets of the composition to efficiently exterminate the flying pests. In addition, from the viewpoint that the action of wetting the alae of flying pests is excellent, the foregoing average addition molar number is preferably 30 or less, more preferably 20 or less, still more preferably 15 or less, even more preferably 12 or less, and even more preferably 10 or less.

The polyoxyalkylene alkyl ether (a1) is preferably a polyoxyethylene lauryl ether, and more preferably a polyoxyethylene lauryl ether in which the average addition molar number of the oxyethylene group is 6 or more and 10 or less.

Examples of the alkyl glyceryl ether (a2) include an alkyl glyceryl ether having an alkyl group having preferably 8 or more and 22 or less carbon atoms, more preferably 8 or more and 18 or less carbon atoms, and still more preferably 8 or more and 14 or less carbon atoms. Although the alkyl group may be any of a linear alkyl group and a branched alkyl group, it is preferably a branched alkyl group from the viewpoint of enhancing the straightness of the sprayed droplets of the composition to efficiently exterminate the flying pests.

Specific examples of the alkyl glyceryl ether (a2) include octyl glyceryl ether, 2-ethylhexyl glyceryl ether, nonyl glyceryl ether, decyl glyceryl ether, isodecyl glyceryl ether, lauryl glyceryl ether, tridecyl glyceryl ether, myristyl glyceryl ether, stearyl glyceryl ether, and isostearyl glyceryl ether. The composition of the present invention may contain two or more kinds thereof as the component (a2). Among these, at least one selected from 2-ethylhexyl glyceryl ether, decyl glyceryl ether, isodecyl glyceryl ether, and lauryl glyceryl ether is preferable, and at least one selected from 2-ethylhexyl glyceryl ether and isodecyl glyceryl ether is more preferable.

The component (A) can be used alone or in combination of two or more thereof.

The total content and each content of the components (A1) and (A2) in the composition of the present invention are preferably 0.05% by mass or more, more preferably 0.10% by mass or more, and still more preferably 0.15% by mass or more from the viewpoint of excellent action of wetting the alae of flying pests, and are preferably 5.0% by mass or less, more preferably 4.0% by mass or less, still more preferably 3.0% by mass or less, even more preferably 2.0% by mass or less, even more preferably 1.5% by mass or less, even more preferably 1.2% by mass or less, even more preferably 1.0% by mass or less, and even more preferably 0.8% by mass or less from the viewpoint of suppressing stickiness and sliminess caused by adhesion of a sprayed composition to a surface to be sprayed (hereinafter, from the viewpoint of suppressing stickiness and sliminess). Although the use place is not particularly limited, for example, in the case of being used indoors, the stickiness and the sliminess to the floor, the wall, or the like can be suppressed.

Further, the content of each of the components (a1) and (a2) constituting the component (A2) is preferably 0.01% by mass or more, more preferably 0.05% by mass or more, still more preferably 0.10% by mass or more, and even more preferably 0.15% by mass or more from the viewpoint of excellent action of wetting the alae of flying pests, and is preferably 3.0% by mass or less, more preferably 2.0% by mass or less, still more preferably 1.0% by mass or less, and even more preferably 0.5% by mass or less from the viewpoint of suppressing stickiness and sliminess.

In the composition of the present invention, the mass ratio [(a1)/(a2)] of the polyoxyalkylene alkyl ether (a1) to the alkyl glyceryl ether (a2) is preferably 0.1 or more, more preferably 0.5 or more, still more preferably 1.0 or more, and even more preferably 2.0 or more from the viewpoint of improving the action of wetting the alae of flying pests, and is preferably 10 or less, more preferably 8.0 or less, still more preferably 6.0 or less, even more preferably 5.0 or less, and even more preferably 4.0 or less from the same viewpoint.

In the present invention, the surfactant (A) may further contain a surfactant other than the components (A1) and (A2).

As the surfactant other than the components (A1) and (A2), from the viewpoint of safety to the human body and the environment, it is preferable to include one or more selected from the group consisting of a nonionic surfactant, an anionic surfactant, and a cationic surfactant, and it is more preferable to include at least one selected from a nonionic surfactant and an anionic surfactant.

Specific examples of the nonionic surfactant include at least one selected from a polyoxyalkylene sorbitan fatty acid ester, an alkyl glucoside, a polyglycerin fatty acid ester, a polyoxyethylene hydrogenated castor oil, an alkylamine oxide, and a polyoxyethylene-modified silicone.

Specific examples of the anionic surfactant include at least one selected from an alkylbenzenesulfonic acid salt, an alkyl or alkenyl ether sulfuric acid salt, an alkyl or alkenyl sulfuric acid salt, an alkylsulfonic acid salt, a saturated or unsaturated fatty acid salt, an alkyl or alkenyl ether carboxylic acid salt, an α-sulfofatty acid salt, an N-acylamino acid, and a phosphoric acid mono- or diester.

Examples of a counter ion of the anionic group of the anionic surfactant include an alkali metal ion, such as a sodium ion and a potassium ion; an alkaline earth metal ion, such as a calcium ion and a magnesium ion; an ammonium ion; and an alkanolammonium having 1 to 3 alkanol groups having 2 or 3 carbon atoms (for example, monoethanolammonium, diethanolammonium, triethanolammonium, and triisopropanolammonium).

Specific examples of the cationic surfactant include at least one selected from an alkyl trimethylammonium salt, an alkoxyalkyl trimethylammonium salt, a dialkyl dimethylammonium salt, an alkylamidoalkyl trimethylammonium salt, a benzalkonium chloride, an alkyl pyridinium salt, an alkyl dimethylamine and a salt thereof, an alkoxyalkyl dimethylamine and a salt thereof, an alkylamidoalkyl dimethylamine and a salt thereof, a diethanolamine monoalkyl ester and a salt thereof, a triethanolamine monoalkyl ester and a salt thereof, and a triethanolamine dialkyl ester and a salt thereof.

In addition, the content of the surfactant (A) in the composition of the present invention is preferably 0.05% by mass or more, more preferably 0.10% by mass or more, and still more preferably 0.15% by mass or more from the viewpoint of excellent action of wetting the alae of flying pests, and is preferably 5.0% by mass or less, more preferably 4.0% by mass or less, and still more preferably 3.0% by mass or less from the viewpoint of suppressing stickiness and sliminess of the composition.

Further, the content of the surfactant (A) in the composition of the present invention is preferably 2.0% by mass or less, more preferably 1.5% by mass or less, still more preferably 1.2% by mass or less, even more preferably 1.0% by mass or less, and even more preferably 0.8% by mass or less from the viewpoint of suppressing stickiness and sliminess. Although the use place is not particularly limited, for example, in the case of being used indoors, the stickiness and the sliminess to the floor, the wall, or the like can be suppressed, and the handleability can be made more favorable.

In addition, the total content of the components (A1) and (A2) in the composition of the present invention is preferably 20 parts by mass or more, more preferably 30 parts by mass or more, still more preferably 40 parts by mass or more, even more preferably 50 parts by mass or more, and is preferably 100 parts by mass or less, when the total amount of the surfactant (A) contained in the composition of the present invention is taken as 100 parts by mass, from the viewpoint of excellent action of wetting the alae of flying pests.

The content of the components (A1) and (A2) in the composition is an amount as a dissociation type when the components are present in a dissociated state in the composition. That is, in the case of sodium dioctyl sulfosuccinate, the content is an amount as dioctyl sulfosuccinate.

<Component (B): Organic Acid or Organic Acid Salt>

The composition of the present invention contains, as a component (B), at least one compound selected from an organic acid and an organic acid salt. By containing the component (B), the composition of the present invention can improve the insecticidal properties against flying pests.

Examples of the component (B) include at least one selected from benzoic acid, lactic acid, sorbic acid, tartaric acid, fumaric acid, malic acid, citric acid, and salts thereof.

From the viewpoint of further improving insecticidal properties, the salt in the organic acid salt is preferably an alkali metal salt, more preferably at least one selected from a sodium salt and a potassium salt, and still more preferably a sodium salt.

The content of the component (B) in the composition of the present invention is preferably 0.03% by mass or more, more preferably 0.05% by mass or more, still more preferably 0.10% by mass or more, and even more preferably 0.15% by mass or more, and is preferably 5.0% by mass or less, more preferably 3.0% by mass or less, still more preferably 2.0% by mass or less, even more preferably 1.0% by mass or less, and even more preferably 0.5% by mass or less, from the viewpoint of further improving insecticidal properties.

In the description herein, the content (% by mass) of the organic acid salt is % by mass in terms of the organic acid constituting the organic acid salt.

In the composition of the present invention, the mass ratio of the component (A) to the component (B) [(A)/(B)] is preferably 0.1 or more, more preferably 0.2 or more, still more preferably 0.3 or more, and even more preferably 0.4 or more, from the viewpoint of improving the action of wetting the alae of flying pests, and is preferably 20 or less, more preferably 15 or less, still more preferably 10 or less, even more preferably 5.0 or less, and even more preferably 2.0 or less, from the viewpoint of further improving insecticidal properties.

<Water>

The flying pest exterminating composition of the present invention contains water as a medium for dissolving or dispersing the surfactant (A) and the compound (B) which are active ingredients for exterminating flying pests.

The content of water in the composition is preferably 80% by mass or more, more preferably 85% by mass or more, still more preferably 88% by mass or more, and even more preferably 90% by mass or more, and is preferably 99.92% by mass or less, more preferably 99% by mass or less, still more preferably 97% by mass or less, and even more preferably 95% by mass or less, from the viewpoint of safety for the human body and the environment and from the viewpoint of easily controlling the sprayed droplets of the composition to have a particle diameter suitable for spraying.

<Component (C): Alcohol>

The flying pest exterminating composition of the present invention preferably further contains an alcohol (C) having 6 or less carbon atoms (hereinafter, also referred to as a "component (C)") from the viewpoint of improving the stability and appearance of the solution.

As the component (C), for example, at least one selected from alcohols having 1 to 5 carbon atoms such as methanol, ethanol, 1-propanol, 2-propanol, and butanol; and diols and triols having 6 or less carbon atoms such as 1,3-butylene glycol, glycerin, ethylene glycol, and propylene glycol can be used. Among these, at least one selected from ethanol and 2-propanol is preferable, and ethanol is more preferable.

When the flying pest exterminating composition of the present invention contains the component (C), the content of the component (C) in the composition is preferably 1.0% by mass or more, more preferably 1.5% by mass or more, still more preferably 2.0% by mass or more, even more preferably 2.5% by mass or more, and even more preferably 4.0% by mass or more, from the viewpoint of further improving the stability and appearance of the solution, and is preferably 20% by mass or less, more preferably 15% by mass or less, still more preferably 10% by mass or less, and even more preferably 8.0% by mass or less, from the viewpoint of reducing alcohol odor and enhancing safety during storage, transportation and use.

<Other Components>

The flying pest exterminating composition of the present invention can contain other components than those as mentioned above, for example, a preservative, a coloring agent, a fragrance, and a pH modifier, within a range where the effects of the present invention are not impaired.

However, from the viewpoint of obtaining the effects of the present invention, the content of components other than the surfactant (A), the compound (B), water, and the alcohol (C) in the flying pest exterminating composition is preferably 20% by mass or less, more preferably 15% by mass or less, still more preferably 10% by mass or less, even more preferably 5% by mass or less, even more preferably 1% by mass or less, and even more preferably 0.5% by mass or less.

From the viewpoint of safety for the human body and the environment, it is preferable that the flying pest exterminating composition of the present invention does not contain an insecticidal component other than the component (B). This is because the flying pest exterminating composition of the present invention has excellent safety to the human body and the environment, and the surfactant (A) capable of effectively wetting the alae of flying pests and the compound (B) capable of effectively killing flying pests are used as active ingredients for exterminating flying pests, and a composition having a high effect of exterminating flying pests can be obtained without containing an insecticidal component other than the component (B).

Examples of the insecticidal component mentioned herein include a pyrethroid-based insecticide, an organophosphorus-based insecticidal component, a carbamate-based insecticidal component, an insecticidal component described in Groups 1 to 32 of IRAC MoA Classification Version 9.4 (March 2020), and an insecticide described in paragraph 0049 of WO2018/079565 (excluding those corresponding to the compound (B)).

Examples of the pyrethroid-based insecticide include metofluthrin, dl,d-T80-allethrin, phthalthrin, d-T80-phthalthrin, d,d-T80-prallethrin, d,d-T98-prallethrin, d-T80-resmethrin, transfluthrin, imiprothrin, cyphenothrin, d,d-T-cyphenothrin, empenthrin, permethrin, phenothrin, etofenprox, and pyrethrin.

Examples of the insecticidal component other than the pyrethroid-based insecticide include an organophosphorus-based insecticide, such as fenitrothion and malathion; a carbamate-based insecticide, such as propoxur and carbaryl; a miticide, such as kelthane, quinomethionate, and hexathiazox; and a neonicotinoid-based insecticide, such as imidacloprid, dinotefuran, and clothianidin.

The wording "does not contain an insecticidal component other than the component (B)" means that the content of the insecticidal component other than the component (B) in the flying pest exterminating composition is less than 1% by mass, preferably 0.1% by mass or less, more preferably 0.01% by mass or less, and still more preferably 0.001% by mass or less, and even more preferably, the insecticidal component other than the component (B) is not substantially contained.

From the viewpoint of safety for the human body and the environment, it is preferred that the flying pest exterminating composition of the present invention does not contain a disinfectant. Examples of the disinfectant as referred to herein include an amphoteric surfactant having a disinfecting effect. The wording "does not contain a disinfectant" means that the content of the disinfectant in the flying pest exterminating composition is less than 0.1% by mass, preferably 0.05% by mass or less, more preferably 0.01% by mass or less, and still more preferably 0.005% by mass or less, and even more preferably, the disinfectant is not substantially contained.

It is preferable that the content of the polymer compound in the flying pest exterminating composition of the present invention is small from the viewpoint of easily adjusting the viscosity of the flying pest exterminating composition to a viscosity suitable for spraying; from the viewpoint of easily controlling the spray droplets of the composition to have a particle diameter suitable for spraying; and from the viewpoint of suppressing stickiness caused by the sprayed composition attaching to the surface to be sprayed during using the flying pest exterminating composition. For example, the content of a (meth)acrylic acid alkyl ester copolymer in the flying pest exterminating composition is preferably less than 0.5% by mass, more preferably less than 0.1% by mass, still more preferably 0.07% by mass or less, and even more preferably 0.05% by mass or less.

The aforementioned (meth)acrylic acid alkyl ester copolymer means a polymer compound resulting from copolymerization of a (meth)acrylic acid alkyl ester, and in particular, a film-formable (meth)acrylic acid alkyl ester copolymer is corresponding thereto.

The film-formable (meth)acrylic acid alkyl ester copolymer may be any of cationic, anionic, nonionic, and amphoteric polymer compounds. Among the film-formable (meth) acrylic acid alkyl ester copolymers, examples of the amphoteric polymer compound include an N-methacryloyloxyethyl N,N-dimethylammonium-α-N-methylcarboxybetaine/methacrylic acid alkyl ester copolymer (e.g., "YUKA FORMER 202", "YUKA FORMER 104D", "YUKA FORMER AMPHOSET", "YUKA FORMER R205S", and "YUKA FORMER SM", all of which are manufactured by Mitsubishi Chemical Corporation), an octylamide acrylate/hydroxypropyl acrylate/butylaminoethyl methacrylate copolymer, and an N-methacryloyloxyethyl N,N-dimethylaminoethyl-α-N-methyl carboxybetaine/alkyl ester methacrylate copolymer.

When the content of the film-formable (meth)acrylic acid alkyl ester copolymer in the flying pest exterminating composition of the present invention is small, an increase in viscosity of the composition is suppressed. For that reason, in the case of using a trigger spray type container as the spray container, a speed of pulling a trigger is not lowered and is stabilized. When the speed of pulling a trigger is fast, since the pressure applied to the droplets becomes high, the sprayed droplets of the composition readily become small. In addition, in view of the fact that the speed of pulling a trigger becomes stable, when the liquid film of the composition comes loose into droplets due to a power of spinning, the sprayed droplets readily become small, and the particle diameter control becomes easy.

In the case where the flying pest exterminating composition of the present invention is filled in an aerosol type container having a propellant filled therein as mentioned later and then used, the content of each of the components in the composition of the present invention means % by mass in the whole quantity from which the propellant is excluded.

The production method of the flying pest exterminating composition of the present invention is not particularly limited. For example, the flying pest exterminating composition can be produced by blending the surfactant (A), the compound (B), water, and the alcohol (C) and other components which are used as the need arises and mixing the blend using a known stirring device or the like.

The pH at 25° C. of the flying pest exterminating composition of the present invention is preferably 3 or more, more preferably 3.5 or more, still more preferably 4 or more, and even more preferably 4.5 or more, from the viewpoint of improving the insecticidal properties and from the viewpoint of safety to the human body and the environment, and is preferably 10 or less, more preferably 8 or less, still more preferably 7 or less, and even more preferably 6 or less, from the same viewpoint.

The pH of the flying pest exterminating composition of the present invention can be adjusted by the surfactant (A), the compound (B), a pH modifier and the like.

From the viewpoint of efficiently exterminating flying pests, the surface tension at 25° C. of the flying pest exterminating composition of the present invention is preferably 23.5 mN/m or more, more preferably 24.0 mN/m or more, still more preferably 24.5 mN/m or more, and even more preferably 25.0 mN/m or more. Further, from the viewpoint that the action of wetting the alae of flying pests is excellent, and the flying ability is lowered to enhance the extermination effect, the foregoing surface tension is preferably 45.0 mN/m or less, more preferably 40.0 mN/m or less, still more preferably 33.0 mN/m or less, even more preferably 31.0 mN/m or less, and even more preferably 29.0 mN/m or less. The surface tension of the composition is measured by the Wilhelmy method in a 25° C. environment. Specifically, the surface tension can be measured by the method described below.

(Measurement Method of Surface Tension)

The composition is used as a measurement sample, and is poured into a glass-made petri dish having a diameter of 6.4 cm and a depth of 3.8 cm. After removing air bubbles from the water surface, the composition is allowed to stand for 30 minutes or more, and then measurement is performed. In this measurement, a surface tension balance "K100" (manufactured by KRUSS GmbH) is used, and a platinum plate is maintained in a state of being immersed in the aforementioned measurement sample in a depth of 1 mm, and a measured value after 10 minutes from the immersion is set as the value of the surface tension.

[Flying Pest Exterminating Spray]

The flying pest exterminating spray of the present invention is composed of a spray container and the flying pest exterminating composition of the present invention filled in the spray container.

<Spray Container>

The spray container used in the flying pest exterminating spray of the present invention is not particularly limited as long as it can be filled with the flying pest exterminating composition and sprayed on flying pests. Examples of such a spray container include an extrusion spray container, such as a trigger spray type container; and an aerosol type container having a propellant filled therein.

Although a capacity of the spray container is not particularly restricted, for example, it is 50 mL or more and 500 mL or less from the viewpoint of spraying towards flying pests.

The injection orifice diameter of the spray container is preferably 0.1 mm or more, more preferably 0.2 mm or more, and still more preferably 0.3 mm or more, from the viewpoint of allowing the spray droplets to easily travel straight without scattering vertically and horizontally and to efficiently reach flying pests, and is preferably 1.5 mm or less, more preferably 1.2 mm or less, and still more preferably 1.0 mm or less, from the same viewpoint. The "injection orifice diameter of the spray container" means a maximum diameter in the inner diameter of the injection nozzle tip of the spray container. Although the shape of the discharge port is not particularly limited, it is preferably circular or oval.

From the viewpoint of readily controlling the average particle diameter of the sprayed droplets of the composition to a specified range, the spray container is preferably an extrusion spray container, more preferably a trigger spray type container, and still more preferably a trigger spray type container having an injection orifice diameter falling within the aforementioned range.

Among the trigger spray type containers, an accumulation type trigger spray container is more preferable from the viewpoint that the sprayed droplets easily travel straight without being scattered vertically and horizontally and efficiently reach flying pests. In general, the accumulation type spray container has a structure in which a piston is slid relative to a cylinder accommodated inside the container, to inject a liquid exceeding a fixed pressure within the cylinder from a nozzle. That is, since the liquid is first injected outside the container in the case where the liquid pressure within the cylinder exceeds the fixed pressure, the accumulation type trigger spray container is advantageous from the standpoint of particle diameter control of the droplets injected.

Examples of the accumulation type trigger spray container include a container described in JP2017-226474A.

In addition, the trigger spray type container may be provided with a foam forming mechanism, but it is preferable that the trigger spray type container does not have a foam forming mechanism from the viewpoint that the sprayed droplets easily travel straight without being scattered vertically and horizontally and efficiently reach flying pests.

Specifically, the "foam forming mechanism" means the following mechanism (1) or (2).

(1) A mechanism having a projection-provided plate-shaped body or a mesh-like barrier, as arranged in an injection port of the container vertically to the injection direction, in which the liquid injected in the form of mist is allowed to collide against the plate-shaped body or the barrier, thereby mixing with air to form foams.

(2) A mechanism having an outside air introduction hole in the vicinity of an injection port of a container, in which the liquid injected in the form of mist is mixed with the introduced outside air within the container and collides against a cylindrical inner wall surface to form foams, which are then injected forward from the injection port.

Specific examples of the above (1) include mechanisms described in FIG. 15 of JP2003-112090A, JP2011-251218A, and FIG. 2 of JP2006-320845A.

Specific examples of the above (2) include mechanisms described in FIG. 2 of JP 2007-167719 A, FIG. 2 of JP 2006-150279 A, and FIG. 2 of JPS52-116919A.

The trigger spray type container having no foam forming mechanism refers to a trigger spray type container of a structure in which the liquid is injected as liquid droplets from the injection port of the nozzle to the outside of the container without going through the aforementioned foam forming mechanism, and preferably, it refers to a trigger spray type container of a structure in which the droplets are injected directly into the outside of the container from the injection port of the nozzle.

The appearance shape of the sprayed droplets discharged from the trigger spray type container having no foam forming mechanism is preferably one in which after 1 minute of spraying one time with a full stroke toward a wall located at a horizontal distance of 30 cm from the injection port of the container at room temperature (25° C.), no bubbles having a size of 100 μm or more are observed. The appearance shape of the sprayed droplets is more preferably one in which after 0.5 minutes of spraying one time with a full stroke toward a wall located at a horizontal distance of 30 cm from the injection port of the container, no bubbles having a size of 100 μm or more are observed.

The discharge amount of the flying pest exterminating composition by the trigger spray type container is preferably 0.2 g/time or more, more preferably 0.5 g/time or more, and still more preferably 0.7 g/time or more in terms of a discharge amount per one time of trigger operation from the viewpoint of making a sufficient amount of the sprayed droplets of the composition reach a flying pest to efficiently exterminate the flying pest. In addition, the discharge amount is preferably 2.0 g/time or less, more preferably 1.5 g/time or less, and still more preferably 1.2 g/time or less from the viewpoint of suppressing stickiness and sliminess when the flying pest exterminating spray is used.

On the other hand, the discharge amount of the flying pest exterminating composition by the aerosol type container is preferably 0.2 g or more, more preferably 0.5 g or more, and still more preferably 0.7 g or more in terms of a discharge amount during spraying for one second from the viewpoint of making a sufficient amount of sprayed droplets of the composition reach a flying pest to efficiently exterminate the flying pest. In addition, the discharge amount is preferably 2.0 g or less, more preferably 1.5 g or less, and still more preferably 1.2 g or less from the viewpoint of suppressing stickiness to be caused due to attachment of the sprayed composition onto the surface to be sprayed when the flying pest exterminating spray is used.

EXAMPLES

The present invention is hereunder described by reference to Examples, but that the present invention is not limited to the scope of Examples. In the present Examples, various evaluations and measurements were performed by the following methods.

(Evaluation of Insecticidal Properties Against Flying Pests)

The evaluation of insecticidal properties against flying pests will be described with reference to FIG. 1 and FIG. 2. FIG. 1 is a schematic plan view of a frame (1) in which a mosquito is enclosed, which is used for the evaluation of the insecticidal properties against flying pests; and FIG. 2 is a schematic view of a state in which the flying pest exterminating composition is sprayed into the frame (1) as viewed from the side surface direction of the frame (1).

As shown in FIG. 1, one mosquito (2) (adult female of *Aedes albopictus*) was placed in a plastic-made frame (1) with an aspect ratio of 6 cm×6 cm and a depth of 4 cm, and a front face (11) and a rear face (12) of the frame (1) were covered by a mesh net (3) having a wire diameter of 0.1 mm and an opening of 1 mm, thereby enclosing the mosquito therein.

Subsequently, as shown in FIG. 2, a spray having the composition of each of the Examples filled in a spray container (4) was fixed at a position where a horizontal distance d until the front face (11) of the frame (1) having the mosquito (2) charged therein was 30 cm such that the tip of the spray nozzle (that is, the injection port) (41) of the spray container (4) reached, and the trigger operation was performed at a substantially constant pressure one time in a full stroke toward the inside of the frame (1) to spray the composition. A symbol (5) in FIG. 2 is a sprayed composition. The time required from the start to the end of pulling of the trigger was 0.38 seconds, and the time required from the start to the end of discharge of the liquid was 0.22 seconds.

The condition of the mosquito (2) was observed and recorded after 10, 20, 30, 60, and 180 minutes. Independent experiments were performed at least six times, and the percentage of mosquitoes killed was calculated.

(Evaluation of Stickiness and Sliminess)

Twenty microliters of the flying pest exterminating composition was dropped on the surface of a tile, spread using the bottom of a glass vial so as to form a circle having a diameter of 3 cm, and allowed to dry naturally. After 1 hour, it was confirmed that the flying pest exterminating composition was dried, and then stickiness and sliminess were evaluated. The stickiness was evaluated based on the following criteria by touching the coated surface five times with the pad of the forefinger of the right hand. The sliminess was evaluated based on the following criteria by tracing the coated surface in one direction with the forefinger of the right hand.

<Evaluation Criteria for Stickiness>

- −3: Not sticky at all
- −2: Not so sticky
- −1: Not somewhat sticky
- 0: Neither
- +1: Somewhat sticky
- +2: Considerably sticky
- +3: Extremely sticky <Evaluation Criteria for Sliminess>

- −3: Not slimy at all
- −2: Not so slimy
- −1: Not somewhat slimy
- 0: Neither
- +1; Somewhat slimy
- +2: Considerably slimy
- +3: Extremely slimy (Evaluation of Appearance)

The appearance of the flying pest exterminating composition under environments of 25.0° C., 27.5° C., and 30.0° C. was evaluated according to the following criteria.

- A: Uniformly transparent
- B: Slightly turbid
- C: White turbid (Measurement of pH)

The pHs of the flying pest exterminating composition of Examples and Comparative Examples were measured at 25° C. using a pH meter (electrode: 6367-10D (manufactured by Horiba, Ltd.)).

(Measurement of Surface Tension)

The flying pest exterminating compositions of Examples and Comparative Examples were used as measurement samples, and were each poured into a glass-made Petri dish having a diameter of 6.4 cm and a depth of 3.8 cm, and after removing air bubbles on the water surface, the measurement was performed at 25° C. in the state that the resulting sample was allowed to stand still for 30 minutes or more. A surface tension balance "K100" (manufactured by KRUSS GmbH) was used, and a platinum plate was maintained in a state of being immersed in the aforementioned measurement sample in a depth of 1 mm, and a measured value after 10 minutes from the immersion was set as the value of the surface tension.

In Examples and Comparative Examples, the following organic acids, organic acid salts, surfactants, and pH modifiers were used.

(Organic Acid)

- Benzoic acid (manufactured by FUJIFILM Wako Pure Chemical Corporation)
- Lactic acid (manufactured by FUJIFILM Wako Pure Chemical Corporation)
- Tartaric acid (manufactured by FUJIFILM Wako Pure Chemical Corporation)
- Fumaric acid (manufactured by FUJIFILM Wako Pure Chemical Corporation)
- Malic acid (manufactured by FUJIFILM Wako Pure Chemical Corporation)
- Citric acid (manufactured by FUJIFILM Wako Pure Chemical Corporation)

(Organic Acid Salt)

- Sodium benzoate (manufactured by FUJIFILM Wako Pure Chemical Corporation)
- Potassium benzoate (manufactured by FUJIFILM Wako Pure Chemical Corporation)

(Surfactant)

- Sodium dioctyl sulfosuccinate (manufactured by TOHO Chemical Industry Co., Ltd., product name: AIRROL CT-1K; manufactured by Sanyo Chemical Industries, Ltd., product name: SANMORIN OT-70S)
- Polyoxyethylene (9) lauryl ether (manufactured by Kao Corporation, product name: EMULGEN 109P)
- 2-Ethylhexyl glyceryl ether (manufactured by Kao Corporation, product name: PENETOL GE-EH)

Sodium N-cocoyl-L-glutamate (manufactured by Ajinomoto Co., Inc., product name: AMISOFT CS-11 (F))

Sodium polyoxyethylene lauryl ether sulfate (manufactured by Kao Corporation, product name: EMAL 270J)

(pH Modifier)

Sodium hydroxide

Sulfuric acid

Examples 1 to 24 and Comparative Examples 1 to 5 (Preparation and Evaluation of Flying Pest Exterminating Composition)

Organic acids, organic acid salts, and surfactants shown in Tables 1 to 4 and a trigger spray type spray container (trigger type: pressure accumulation, capacity of 370 mL, injection orifice diameter: 0.8 mm, discharge amount: 0.9 g/time) were each prepared.

Each component used in the flying pest exterminating composition was prepared with the composition shown in Tables 1 to 4. In the preparation, each component was dissolved by a stirrer so as to be a homogeneous system. The amounts shown in Tables 1 to 4 are each the amount of the active ingredient (% by mass) of each component. The amount of the surfactant (A) described in each table is an amount of a dissociation type as described above. In addition, a nonionic surfactant which is not dissociated in the composition is a blending amount. In addition, the amounts of sodium polyoxyethylene lauryl ether sulfate and sodium N-cocoyl-L-glutamate were expressed in terms of the blending amounts, instead of the amounts of a dissociation type. Further, the content (% by mass) of the organic acid salt is % by mass in terms of the organic acid constituting the organic acid salt.

The composition was filled in a spray container to fabricate a flying pest exterminating spray.

Using the obtained flying pest exterminating spray, various evaluations were performed by the aforementioned methods. The evaluation results are shown in Tables 1 to 4, respectively. The evaluation of the handleability (stickiness and sliminess) was performed only in Examples 6 and 17 to 19. In addition, the evaluation of the appearance was performed only in Examples 6 and 20 to 24.

TABLE 1

| | | | | Example | | | | | | | |
|---|---|---|---|---|---|---|---|---|---|---|---|
| | | | | 1 | 2 | 3 | 4 | 5 | 6 | 7 | 8 |
| Composition blend (% by mass) | Component (A1) | | Sodium dioctyl sulfosuccinate | 0.19 | 0.19 | 0.19 | 0.19 | 0.19 | 0.33 | 0.28 | |
| | Component (A2) | a1 | Polyoxyethylene (9) lauryl ether | | | | | | | | 0.30 |
| | | a2 | 2-Ethylhexyl glyceryl ether | | | | | | | | 0.10 |
| | Surfactant other than (A1) and (A2) | | Sodium N-cocoyl-L-glutamate | 0.15 | 0.15 | 0.15 | 0.15 | 0.15 | | | |
| | Compound (B) | | Benzoic acid | | | | | | | | |
| | | | Lactic acid | | | | | | | | |
| | | | Tartaric acid | | | | | | | | |
| | | | Fumaric acid | | | | | | | | |
| | | | Malic acid | | | | | | | | |
| | | | Citric acid | | | | | | | | |
| | | | Sodium benzoate | 0.25 | 0.17 | 0.08 | 0.25 | 0.25 | 0.25 | 0.25 | 0.25 |
| | | | Potassium benzoate | | | | | | | | |
| | Alcohol (C) | | Ethanol | 6.5 | 6.5 | 6.5 | 6.5 | 6.5 | 6.5 | 6.5 | 6.5 |
| | pH modifier | | Sodium hydroxide | | | | | 0.001 | | | |
| | | | Sulfuric acid | 0.02 | 0.01 | 0.01 | 0.07 | | 0.01 | 0.01 | 0.01 |
| | Water | | | 92.89 | 92.98 | 93.07 | 92.84 | 92.91 | 92.91 | 92.96 | 92.84 |
| | pH | | | 5 | 5 | 5 | 4 | 7 | 5 | 5 | 5 |
| | Surface tension [mN/N] | | | 26.2 | 26.8 | 28.7 | 26.0 | 27.6 | 25.2 | 25.5 | 26.0 |
| Evaluation results | Percentage of mosquitoes killed [%] | | | 88 | 100 | 43 | 86 | 83 | 100 | 93 | 65 |

| | | | | Example | | | | | | | |
|---|---|---|---|---|---|---|---|---|---|---|---|
| | | | | 9 | 10 | 11 | 12 | 13 | 14 | 15 | 16 |
| Composition blend (% by mass) | Component (A1) | | Sodium dioctyl sulfosuccinate | 0.19 | 0.19 | 0.19 | 0.19 | 0.19 | 0.19 | 0.19 | 0.19 |
| | Component (A2) | a1 | Polyoxyethylene (9) lauryl ether | | | | | | | | |
| | | a2 | 2-Ethylhexyl glyceryl ether | | | | | | | | |
| | Surfactant other than (A1) and (A2) | | Sodium N-cocoyl-L-glutamate | 0.15 | 0.15 | 0.15 | 0.15 | 0.15 | 0.15 | 0.15 | 0.15 |
| | Compound (B) | | Benzoic acid | 0.30 | | | | | | | |
| | | | Lactic acid | | 0.30 | | | | | | |
| | | | Tartaric acid | | | 0.30 | | | | | |
| | | | Fumaric acid | | | | 0.30 | | | | |
| | | | Malic acid | | | | | 0.30 | | | |
| | | | Citric acid | | | | | | 0.30 | | |
| | | | Sodium benzoate | | | | | | | | 0.25 |

TABLE 1-continued

| | | | | | | | | | | |
|---|---|---|---|---|---|---|---|---|---|---|
| | | Potassium benzoate | | | | | | | 0.23 | |
| | Alcohol (C) | Ethanol | 6.5 | 6.5 | 6.5 | 6.5 | 6.5 | 6.5 | 6.5 | 6.5 |
| | pH modifier | Sodium hydroxide | 0.02 | 0.09 | 0.15 | 0.18 | 0.14 | 0.11 | | 0.002 |
| | | Sulfuric acid | | | | | | | 0.02 | |
| | Water | | 92.84 | 92.77 | 92.71 | 92.68 | 92.72 | 92.75 | 92.91 | 92.91 |
| | pH | | 5 | 5 | 5 | 5 | 5 | 5 | 5 | 9 |
| | Surface tension [mN/N] | | 26.2 | 26.4 | 26.1 | 25.7 | 25.8 | 25.8 | 27.5 | 29.9 |
| Evaluation results | Percentage of mosquitoes killed [%] | | 50 | 71 | 70 | 67 | 50 | 70 | 78 | 38 |

TABLE 2

| | | | | Comparative Example | | | | |
|---|---|---|---|---|---|---|---|---|
| | | | | 1 | 2 | 3 | 4 | 5 |
| Composition blend (% by mass) | Component (A1) | | Sodium dioctyl sulfosuccinate | 0.19 | | | | |
| | Component (A2) | a1 | Polyoxyethylene (9) lauryl ether | | | | 0.40 | |
| | | a2 | 2-Ethylhexyl glyceryl ether | | | | | 0.40 |
| | Surfactant other than (A1) and (A2) | | Sodium N-cocoyl-L-glutamate | 0.15 | | | | |
| | | | Sodium polyoxyethylene lauryl ether sulfate | | | 0.28 | | |
| | Compound (B) | | Sodium benzoate | | 0.25 | 0.25 | 0.25 | 0.25 |
| | Alcohol (C) | | Ethanol | 6.5 | 6.5 | 6.5 | 6.5 | 6.5 |
| | pH modifier | | Sulfuric acid | 0.2 | 0.01 | 0.01 | 0.01 | 0.01 |
| | Water | | | 92.96 | 93.24 | 92.96 | 92.84 | 92.84 |
| | pH | | | 5 | 5 | 5 | 5 | 5 |
| | Surface tension [mN/N] | | | 30.1 | 72.8 | 33.2 | 30.8 | — |
| Evaluation results | Percentage of mosquitoes killed [%] | | | 25 | 0 | 17 | 0 | layer separation and non-uniformity |

TABLE 3

| | | | Example | | | |
|---|---|---|---|---|---|---|
| | | | 6 | 17 | 18 | 19 |
| Composition blend (% by mass) | Component (A1) | Sodium dioctyl sulfosuccinate | 0.33 | 0.95 | 1.90 | 2.84 |
| | Compound (B) | Sodium benzoate | 0.25 | 0.25 | 0.25 | 0.25 |
| | Alcohol (C) | Ethanol | 6.5 | 6.5 | 6.5 | 6.5 |
| | pH modifier | Sulfuric acid | 0.01 | 0.01 | 0.01 | 0.01 |
| | Water | | 92.91 | 92.29 | 91.34 | 90.40 |
| | pH | | 5 | 5 | 5 | 5 |
| | Surface tension [mN/N] | | 25.8 | 27.3 | 25.2 | 25.1 |
| Evaluation results | Stickiness evaluation | | −3 | −2 | −1 | +1 |
| | Sliminess evaluation | | −1 | −2 | 0 | +2 |

TABLE 4

| | | | Example | | | | | |
|---|---|---|---|---|---|---|---|---|
| | | | 6 | 20 | 21 | 22 | 23 | 24 |
| Composition blend (% by mass) | Component (A1) | Sodium dioctyl sulfosuccinate | 0.33 | 0.33 | 0.33 | 0.33 | 0.33 | 0.33 |
| | Compound (B) | Sodium benzoate | 0.25 | 0.25 | 0.25 | 0.25 | 0.25 | 0.25 |
| | Alcohol (C) | Ethanol | 6.5 | 0.0 | 0.25 | 1.0 | 2.0 | 3.0 |
| | pH modifier | Sulfuric acid | 0.01 | 0.01 | 0.01 | 0.01 | 0.01 | 0.01 |

TABLE 4-continued

| | | | Example | | | | | |
|---|---|---|---|---|---|---|---|---|
| | | | 6 | 20 | 21 | 22 | 23 | 24 |
| | Water | | 92.91 | 99.41 | 99.16 | 98.41 | 97.41 | 96.41 |
| | pH | | 5 | 5 | 5 | 5 | 5 | 5 |
| Evaluation results | Percentage of mosquitoes killed [%] | | 100 | 100 | 100 | 100 | 100 | 100 |
| | Appearance evaluation | 25.0° C. | A | C | C | C | C | A |
| | | 27.5° C. | A | C | C | C | B | A |
| | | 30.0° C. | A | C | C | B | A | A |

From Tables 1 to 4, it is found that the flying pest exterminating composition of the present invention is excellent in an insecticidal effect against mosquitoes which are flying pests. The flying pest exterminating composition of Comparative Example 5 was not evaluated because of layer separation and non-uniformity.

INDUSTRIAL APPLICABILITY

According to the present invention, it is possible to obtain a flying pest exterminating composition and a flying pest exterminating spray, which are used by spraying on flying pests, have high safety to the human body and the environment, and have improved insecticidal properties.

REFERENCE SIGNS LIST

1: Frame
11: Front face of frame
12: Rear face of frame
2: Mosquito
3: Mesh net
4: Spray container
41: Tip of injection nozzle (injection port) of spray container
5: Flying pest exterminating composition sprayed

The invention claimed is:

1. A flying pest exterminating composition which is used by spraying on flying pests, comprising:

a surfactant (A);

at least one compound (B) selected from an organic acid and an organic acid salt; and water, wherein the surfactant (A) comprises at least one selected from (A1) a salt of a mono or di ester of an aliphatic alcohol having 5 or more and 18 or less carbon atoms and sulfosuccinic acid, and (A2) a mixture of a polyoxyalkylene alkyl ether (a1) and an alkyl glyceryl ether (a2), and a mass ratio [(A)/(B)] of the surfactant (A) to the compound (B) is 0.1 or more and 15 or less.

2. The flying pest exterminating composition according to claim 1, wherein a content of the surfactant (A) is 0.05% by mass or more and 5.0% by mass or less.

3. The flying pest exterminating composition according to claim 1, wherein a content of the compound (B) is 0.03% by mass or more.

4. The flying pest exterminating composition according to claim 1, wherein a mass ratio [(A)/(B)] of the surfactant (A) to the compound (B) is 0.3 or more and 10 or less.

5. The flying pest exterminating composition according to claim 1, wherein the composition has a pH at 25° C. of 3 or more and 8 or less.

6. The flying pest exterminating composition according to claim 1, wherein the composition has a surface tension at 25° C. of 23.5 mN/m or more and 45.0 mN/m or less.

7. The flying pest exterminating composition according to claim 1, wherein the salt (A1) is at least one selected from a sodium salt and a potassium salt.

8. The flying pest exterminating composition according to claim 1, wherein the compound (B) comprises at least one selected from benzoic acid, lactic acid, sorbic acid, tartaric acid, fumaric acid, malic acid, citric acid, and salts thereof.

9. The flying pest exterminating composition according to claim 1, further comprising an alcohol (C) having 6 or less carbon atoms.

10. The flying pest exterminating composition according to claim 9, wherein the alcohol (C) is at least one selected from ethanol and 2-propanol.

11. The flying pest exterminating composition according to claim 9, wherein a content of the alcohol (C) is 1.0% by mass or more.

12. The flying pest exterminating composition according to claim 1, wherein a content of the water is 80% by mass or more and 99.92% by mass or less.

13. A flying pest exterminating spray comprising a spray container and the flying pest exterminating composition according to claim 1 filled in the spray container.

14. The flying pest exterminating composition according to claim 1, wherein a content of the surfactant (A) is 0.10% by mass or more and 2.0% by mass or less.

15. The flying pest exterminating composition according to claim 1, wherein a content of the compound (B) is 0.15% by mass or more and 5.0% by mass or less.

16. The flying pest exterminating composition according to claim 1, wherein a mass ratio [(A)/(B)] of the surfactant (A) to the compound (B) is 0.4 or more and 5.0 or less.

17. The flying pest exterminating composition according to claim 1, wherein a content of the insecticidal component other than the component (B) is 0.1% by mass or less.

18. The flying pest exterminating composition according to claim 9, wherein the alcohol (C) is ethanol, a content of the ethanol is 1.0% by mass or more and 8.0% by mass or less.

* * * * *